G. H. BRUNER.
ATTACHMENT FOR MANURE SPREADERS.
APPLICATION FILED NOV. 3, 1915.
1,233,749.
Patented July 17, 1917.
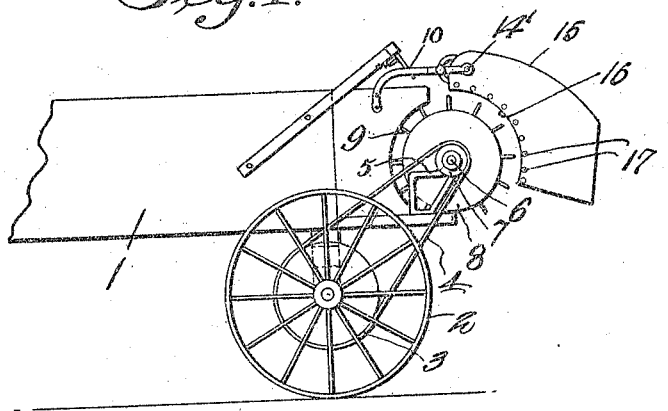
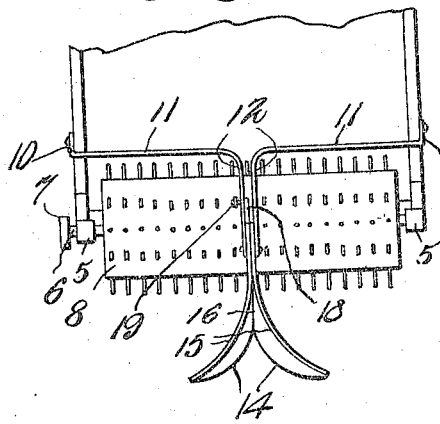
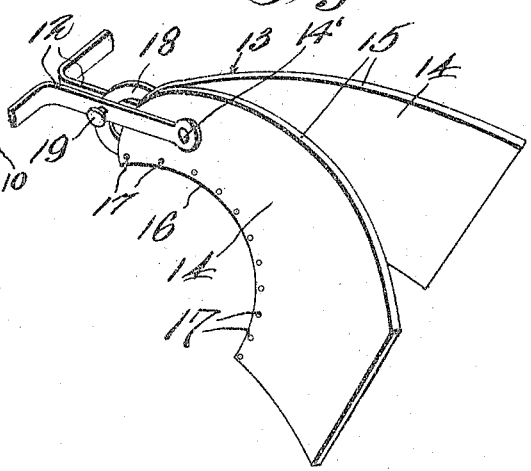
Inventor
George H. Bruner,
Witnesses
By
Attorney

UNITED STATES PATENT OFFICE.

GEORGE H. BRUNER, OF VINTON, IOWA.

ATTACHMENT FOR MANURE-SPREADERS.

1,233,749.

Specification of Letters Patent.

Patented July 17, 1917.

Application filed November 3, 1915. Serial No. 59,396.

*To all whom it may concern:*

Be it known that I, GEORGE H. BRUNER, a citizen of the United States, residing at Vinton, in the county of Benton and State of Iowa, have invented certain new and useful Improvements in Attachments for Manure-Spreaders; and I do hereby declare the following to be a full, clear, and exact description of the invention, such as will enable others skilled in the art to which it appertains to make and use the same.

This invention relates to new and useful improvements in attachments for manure spreaders and the principal object of the invention is to provide a device which will effectively cause the fertilizing material thrown from a manure distributer to fall on opposite sides of a row of grain, so as to avoid loading down the plants when a top dressing of the fertilizer is being spread after the corn or other crop has grown.

Another object of the invention is to provide a device which may be adjusted to suit varying conditions so that larger or smaller plants may be fertilized and yet properly protected from the falling material.

With these and other objects in view, the invention consists in the novel combination and arrangement of parts which will be fully set forth in the following specification and accompanying drawings, in which:

Figure 1 is a fragmentary view of the fertilizing distributer showing the attachment applied thereto.

Fig. 2 is a top plan view of Fig. 1, and

Fig. 3 is a detail perspective view of the attachment.

Referring to the drawings, the numeral 1 designates the body of the manure distributer, while the numeral 2 designates one of the rear supporting wheels thereof. This wheel carries a suitable belt-wheel 3 over which the belt 4 passes, and mounted at the rear end of the body 1 is a suitable bracket 5 in which the shaft 6 is rotatably mounted. This shaft 6 carries a suitable pulley wheel 7, over which the belt passes and the distributer drum 8 carrying a plurality of teeth or disintegrators 9.

Mounted on the sides of the distributer are the upwardly and rearwardly inclined bars 10, the upper ends of which are bent inwardly as at 11 and project toward each other to a point substantially centrally of the wagon whereupon they are bent outwardly and extend parallel as at 12. These parallel arms form the supporting means for the shield designated generally by the numeral 13 which will be more fully hereinafter described.

The shield above referred to comprises a shield plate 14, the upper edges 15 of which are curved as shown, while the lower edges are provided with the arcuate recess 16 and are secured together by suitable rivets 17. These shield plates 14 gradually spread apart toward their rear ends and have their outer faces concavely curved for deflecting the manure in both directions from the center of the bed 1 as clearly illustrated in the drawings. The plates 14 carry at their adjacent forward ends, the loop or eye 18 which coöperates with the screw 19 in holding the device in its assembled position. The set screw 19 engages one of the surfaces of the loop 18, for clamping the plates 14 in various adjusted pivotal positions, for regulating the manure deflecting action of these plates. The plates 14 are pivotally connected to the spaced parallel arms 12 as indicated at 14'.

It will be apparent from the foregoing that in use, the manure to be distributed is loaded into the body 1 of the distributer and upon driving over the field it will be evident that the drum 8 will be rotated, thereby causing the manure to be thrown out at the rear of the vehicle. The falling manure will engage the deflector plates 14 and these passing directly over the tops of the corn rows will cause the falling particles of the manure to land between the rows, thus avoiding injury to the plants by overloading them due to the weight of the fertilizer. In this way it will be seen that the plants will be protected against injury and will also receive the necessary fertilization.

While in the foregoing there has been shown and described the preferred embodiment of this invention, it is to be understood that such changes may be made in the combination and arrangement of parts as will fall within the spirit and scope of the appended claims.

What is claimed is:—

1. The combination with an ordinary manure spreader including a bed and a spreading drum, of a pair of diverging manure deflecting plates pivotally supported equidistant of the ends of the drum for deflecting manure laterally from the center of the bed, said plates having their lower edges connected, the plates being curved outwardly and having their outer surfaces concavely curved, and means for holding said plates in adjusted pivotal positions.

2. The combination with an ordinary manure spreader including a bed and a spreading drum, of a pair of arms attached to said bed and extending upwardly and rearwardly therefrom, said arms being bent to position their inner ends substantially equidistant of the sides of the bed and in parallel relation to each other, a pair of plates pivotally connected to said parallel ends, said plates having their forward ends engaging, said plates diverging from their engaging ends and having their outer surfaces concavely curved for deflecting manure from the center of said bed, a loop attached to one of said plates, a set screw carried by one of said parallel ends and engaging said loop for holding said plates in adjusted pivotal positions with respect to said parallel ends.

In testimony whereof I affix my signature in presence of two witnesses.

GEORGE H. BRUNER.

Witnesses:
W. E. BICKEL,
GEO. H. BICKEL.

Copies of this patent may be obtained for five cents each, by addressing the "Commissioner of Patents, Washington, D. C."